Jan. 5, 1926.
J. W. WHITE
MANUFACTURE OF GEARS
Filed Dec. 1, 1920
1,568,648
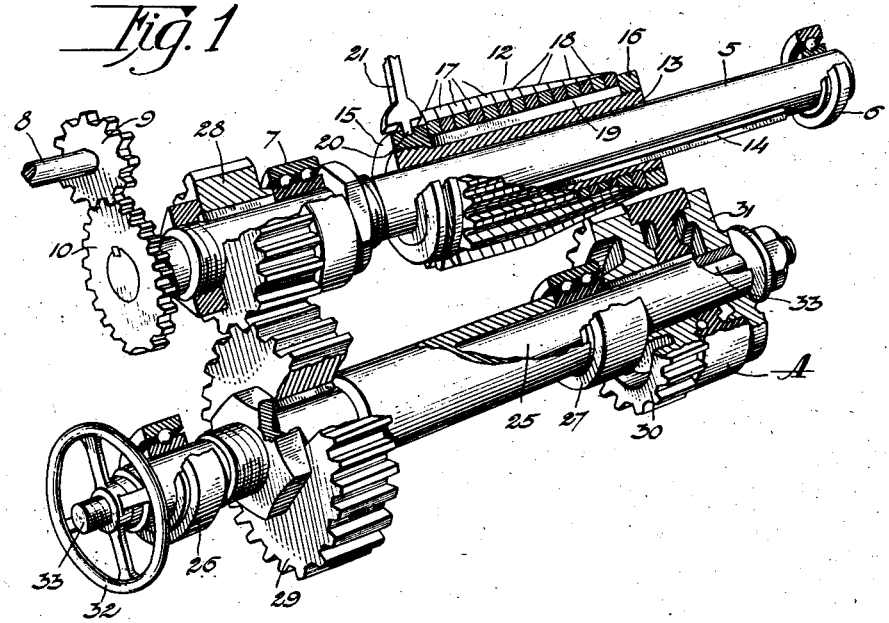
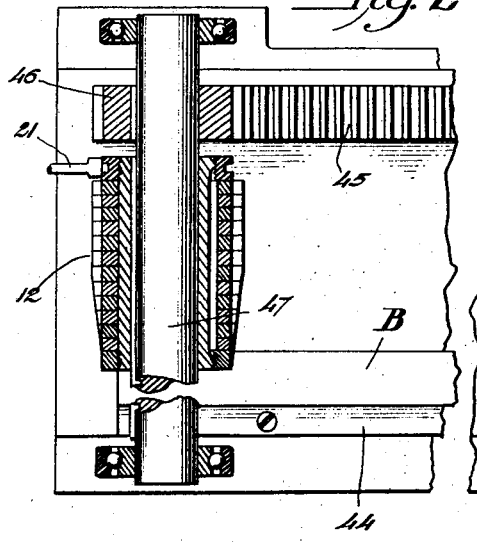
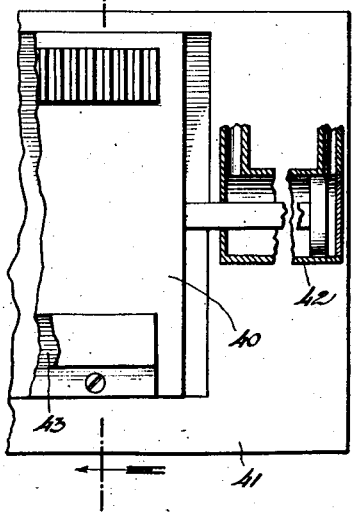
Inventor
John W. White.
By his Attorneys Patented Jan. 5, 1926.

1,568,648

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

MANUFACTURE OF GEARS.

Application filed December 1, 1920. Serial No. 427,597.

*To all whom it may concern:*

Be it known that I, JOHN W. WHITE, a citizen of the United States, and a resident of Detroit, county of Wayne, and State of Michigan, have invented certain new and useful Improvements in the Manufacture of Gears, of which the following is a full, clear, concise, and exact description, such as will enable others skilled in the art to which the invention relates to make and use the same, reference being made therein to the accompanying drawings, which form a part of this specification.

The invention relates to the manufacture of toothed gear elements, such as gear wheels, racks, segments, and the like, by the method which involves the impressing of teeth in a plastic blank by means of a toothed forming element. The process is similar to a metal rolling operation, and the forming element may be in the nature of a roll, having teeth of the desired pitch and contour. The blank in which teeth are to be formed may be of any desired shape corresponding to that of the gear element to be produced, and when metallic gears are to be made, the blank will preferably be heated as is usual in connection with metal rolling.

In the accompanying drawings,

Figure 1 is a perspective view, showing one form of apparatus adapted to form a gear wheel by impressing teeth in a plastic blank.

Figure 2 is a plan view, partly in section, showing a form of apparatus adapted to form a gear rack by a similar method, and Figure 3 is a section on line 3—3 of Figure 2.

In the structure illustrated in Figure 1, 5 indicates a shaft which may be mounted to rotate in anti-friction bearings, as shown at 6, 7. The shaft may be driven from a suitable source of power, as from the motor shaft 8, by gearing connections, as by gear wheels 9, 10. Upon the shaft 5 is mounted a forming element 12 comprising a sleeve 13 mounted to rotate with the shaft 5 but slidable thereon, the sleeve having a keyway engaging with the key 14 on the shaft. Upon the exterior of the sleeve adjacent the ends are mounted screw collars 15, 16, between which are confined a plurality of toothed rings 17 and 18, all of the rings being keyed to the sleeve as by the key 19. A certain number of the rings at the rear end of the forming element, as the rings 17, are of uniform diameter and have teeth of full size corresponding to the dimensions and contour of the teeth to be impressed or rolled in the blank. Toward the forward end of the forming element however the rings, indicated at 18, are gradually diminishing dimensions, giving the forming element as a whole, tapered exterior. The forming element accordingly constitutes a pinion, with transverse sections, and of decreasing diameter or length of teeth toward the forward end, i. e., the end which is designed to come first into contact with the blank.

Means is provided for moving the forming element or pinion axially, or laterally of the work piece, during the rolling or forming operation. The means shown comprises an annular groove 20 in the collar 15 engaged by a shifting element 21 which may be actuated in a direction parallel to the axis of shaft 5 by any usual form of mechanism suitable for the purpose. The actuation of the shifting element 21 may occur simultaneously with the rotation of the forming pinion or not as desired, and it will be obvious that the pinion may be given a continuous forward motion during the progress of the forming operation. Since the rotation and the axial movement of the pinion are produced by independent actuating devices it will be seen that each of the two motions may be varied at will independently of the other.

A second shaft 25 is mounted parallel to the shaft 5, and supported in suitable bearings, as 26, 27. The two shafts may be connected for synchronous rotation at the same angular velocity by gears 28, 29, the former keyed to the shaft 5 and the latter to the shaft 25.

A master gear 30 having the same number of teeth as are to be formed in the blank and adapted to mesh with the forming element is keyed to shaft 25. A blank A, which may be of metal heated to increase its plasticity, is supported to rotate with the master gear, and as shown may be clamped to one face of the gear by a chuck device 31 actuated by the hand wheel 32 operating upon the threaded spindle 33 passing through the hollow interior of shaft 25.

In the operation of the mechanism described above, the blank A having been secured in position and being of a diameter sufficient to provide the metal necessary to form a gear with the same diameter as that of the master gear, the forming element may be put in rotation and shifted axially to bring the teeth at the forward end into engagement with the blank. The teeth of the former at this time will also mesh with those of the master gear, the gear acting as a guide for the forming element. As the said element is shifted further and further forward the teeth will form deeper indentations in the blank until at the close of the operation the teeth 17 of maximum or normal dimensions are in engagement with the blank across its entire face, thus giving the teeth on the blank the desired final configuration.

As the sections of the forming element are subject to rapid wear they must be frequently renewed. This may readily be accomplished with the structure described by merely adding new sections successively at the rear of the pinion, a worn section being removed from the forward end as one is added at the rear.

In the rolling or shaping of gears by the method disclosed it is advisable, in order to prevent the teeth being formed on the blank from being folded over or distorted, to reverse the direction of rotation of the forming element at intervals. Accordingly I contemplate the operation of the shaft 5 first in one direction and then in the other alternately. It will be noted that this operation will in no way affect the progressive axial movement of the forming pinion which movement may remain continuous or not as desired.

In the form illustrated in Figures 2 and 3 the element in which teeth or indentations are to be formed is shown as a bar B, which may, of course, be rolled to any desired cross-section. The forming element 12 in this case will be of the same character as already described, being adapted to be shifted axially across the face of the blank by a shifting device 21. The blank B is supported upon a carriage 40 adapted to be reciprocated upon a table or support 41 as by the fluid pressure motor device shown at 42. The blank is placed in a seat 43 in the reciprocating carriage and may be retained by a side bar 44. A master rack 45, formed upon or otherwise rigidly connected to the carriage 40, is adapted to mesh with a master gear 46 secured to rotate with the shaft 47 upon which the forming pinion 12 is mounted.

In the operation of this form of the device the reciprocation of the carriage 40 will cause the rotation of the shaft 47 and thereby rotate the forming pinion at such rate as to produce in the blank B teeth of pitch similar to that of the teeth of the master rack. The lateral or axial movement of the forming pinion will be substantially the same as in the form shown in Figure 1.

It will be evident that still other modifications may be made, and also various changes in the details of construction without departing from the spirit of the invention and the scope thereof as defined in the appended claims and therefore I do not desire to be limited to the specific details above described.

I do not claim herein specifically the method or apparatus for manufacturing gear racks, such subject matter being included in my copending application Serial No. 428,292.

I claim:

1. In gear forming apparatus, a tooth-forming element, means for continuously supporting a blank in predetermined relation to said element, mechanism for causing relative movement of said element and said means whereby teeth may be impressed in said blank, and mechanism for producing relative movement of said element and said means transversely of the blank whereby the element is caused to travel laterally across the face of the blank.

2. In gear forming apparatus, a rotary pinion adapted to form teeth by impression in plastic material, means for continuously supporting a blank in predetermined relation to said pinion and for moving it so as to be operated upon by said pinion, said pinion having a portion of smaller diameter adapted to engage first with the surface of said blank, and means for moving said pinion axially during the forming operation.

3. Apparatus for forming gears by impression in plastic material comprising a rotary forming element, means supporting said element for rotary and axial movement, means for producing both rotary and axial movement of said element, means for supporting a blank in position to be operated upon by said element, and means for positively moving said blank in synchronism with said element.

4. Apparatus for forming gear wheels by impression in plastic material comprising a rotary forming element, means supporting said element for rotary and axial movement, independent means for simultaneously producing both rotary and axial movement of said element and means for supporting and positively rotating a blank in position to be operated upon by said element.

5. In gear forming apparatus a rotary pinion adapted to form gear teeth by impression in plastic material, a master gear with which said pinion engages, and means for supporting a blank in proximity to said master gear.

6. In gear forming apparatus, a rotary pinion adapted to form gear teeth by impression in plastic material, a rotary master gear with which said pinion engages, means for supporting a gear wheel blank in proximity to said master gear, and means for rotating said pinion and said blank.

7. In gear forming apparatus, a rotary pinion adapted to form gear teeth by impression in plastic material, means for moving said pinion axially, a master gear with which said pinion engages, the teeth of said gear serving to guide said pinion in its axial movement, and means for supporting a blank to rotate with said gear and in position to be operated upon by said pinion.

8. In gear forming apparatus, a sectional pinion adapted to form gear teeth by impression in plastic material said pinion having a portion comprising a plurality of sections in which the teeth are of maximum length corresponding to the contour of teeth to be formed in the blank and another portion comprising a plurality of sections in which the teeth are of gradually increasing length.

9. In gear forming apparatus, an element adapted to form gear teeth in a plastic blank by impression, said element being divided transversely into sections, the parts being so constructed and arranged that worn sections may be removed at one end and new sections may be added at the other end.

10. In gear forming apparatus, a rotary pinion adapted to form gear teeth in a plastic material by a rolling operation, said pinion being divided transversely of its axis into a plurality of sections.

11. In gear forming apparatus, a rotary pinion adapted to form gear teeth in a plastic blank by a rolling operation, said pinion being divided transversely into sections, successive sections from one end toward the other having teeth of progressively increasing length.

12. Apparatus for the forming of gears by impression in a plastic blank which comprises a tooth forming element, means for rotatably supporting a blank in position to be operated upon by said tooth-forming element, and means for rotating said tooth-forming element in engagement with said blank, and for alternating the direction of such rotation.

13. In gear forming apparatus, a rotary shaft adapted to support and rotate a gear wheel blank, a second shaft having a forming element mounted thereon to rotate therewith, said blank and forming element being relatively movable axially to bring said element into engagement with said blank, and means for rotating said shafts.

14. In gear forming apparatus, a rotary shaft adapted to support a gear wheel blank, a second shaft, means for rotating said shafts simultaneously, and a forming element mounted upon said second shaft and shiftable axially thereon into engagement with said blank.

15. In gear forming apparatus, a rotary shaft adapted to support to rotate therewith, a gear wheel blank, a second shaft gearing connecting said shafts for simultaneous rotation, and a forming element mounted upon said second shaft to rotate therewith and shiftable axially into engagement with said blank.

In testimony whereof I affix my signature.

JOHN W. WHITE.